United States Patent [19]

Anezaki

[11] Patent Number: 4,994,998
[45] Date of Patent: Feb. 19, 1991

[54] APPARATUS AND METHOD FOR STRUCTURING DATA WRITTEN ACCORDING TO ISO/8824/ASN.1 SPECIFICATION

[75] Inventor: Akihiro Anezaki, Tokyo, Japan

[73] Assignee: NEC Corporation, Tokyo, Japan

[21] Appl. No.: 305,911

[22] Filed: Feb. 3, 1989

[30] Foreign Application Priority Data

Feb. 5, 1988 [JP] Japan .................................. 63-26465

[51] Int. Cl.⁵ .............................................. G06F 15/20
[52] U.S. Cl. .................................... 364/900; 364/943; 364/44
[58] Field of Search ... 364/200 MS File, 900 MS File

[56] References Cited

U.S. PATENT DOCUMENTS

| 4,498,147 | 2/1985 | Agnew et al. | 364/900 |
| 4,608,662 | 8/1986 | Watanabe et al. | 364/900 |
| 4,912,669 | 3/1990 | Iwamoto et al. | 364/900 |
| 4,918,648 | 4/1990 | Taguchi et al. | 364/900 |

OTHER PUBLICATIONS

International Standard, ISO/8824, "Information Processing Systems—Open Systems Interconnection—Specification of Abstract Syntax Notation One (ASN.1)", First edition, Dec. 15, 1987.

*Primary Examiner*—Thomas M. Heckler
*Attorney, Agent, or Firm*—Foley & Lardner, Schwartz, Jeffery, Schwaab, Mack, Blumenthal & Evans

[57] ABSTRACT

In a data structuring apparatus, input character strings written in accordance with the specification of ISO/8824/ASN.1 are decomposed and keywords representative of types and attributes are detected from the decomposed character strings. Type nodes are created from the detected type representative keywords and attribute nodes are created from the attribute representative keywords. Internode linking means is provided for establishing links between the type nodes and the attribute nodes according to hierarchical relationships between them and forming a tree structure by the established links. The tree structure is traced and the input character strings are translated according to the traced tree structure into a declaration sentence which can be processed by a computer program.

2 Claims, 7 Drawing Sheets

PDU : : = SEQUENCE ( a   INTEGER, b   IA5String, c   INTEGER OPTIONAL

)

ASN.1 CHARACTER STRINGS
APPLIED TO DATA STRUCTURING
APPARATUS 10

Fig. 8

C-LANGUAGE DECLARATION
CHARACTER STRINGS

```
struct t1 t11    = { INTEGER_TYPE_,
                     NULL                   };

struct ea1 ea11  = { NULL,         3,
                     OPTIONAL_,    &t11     };

struct t1 t12    = { IA5String_TYPE_,
                     NULL                   };

struct ea1 ea12  = { &ea11,        2,
                     0,            &t12     };

struct ea1 ea13  = { &ea12,        1,
                     0,            &t11     };

struct t1 t14    = { SEQUENCE_TYPE_,
                     &ea13                  };

struct ea1 ea14  = { NULL,         0,
                     0,            &t14     };
```

APPARATUS AND METHOD FOR STRUCTURING DATA WRITTEN ACCORDING TO ISO/8824/ASN.1 SPECIFICATION

BACKGROUND OF THE INVENTION

The present invention relates generally to the structuring of data to be stored in a program for processing protocols, and more particularly to an apparatus and method for structuring abstract syntax to be used as protocols for the presentation and application layers of the ISO (International Organization and Standardization) Open Systems Interconnection (OSI) seven-layer network model according to the ISO 8824 "Specification of Abstract Syntax Notation One (ASN.1)".

In conventional computer networks, one signal processing method involves analyzing the data structure of a received signal by utilizing the relatively simple structure of syntax. If this method is adopted for processing signals according to the ISO/8824/ASN.1 specification, the program for processing the protocols would become prohibitively complex for implementation. Another processing method involves storing the ASN.1 notation as a string of characters in a program and scanning the strings to analyze the data structure of a signal. If the latter is adopted, however, the scanning process must be performed at each end of an on-line network and would, therefore, prohibitively increase the overhead of a communication.

SUMMARY OF THE INVENTION

It is therefore an object of the present invention to provide a method for structuring the ISO/8824/ASN.1 character strings into a declaration programming language in order to permit computers to directly process telecommunication signals.

The above-mentioned problems can be solved by a data structuring apparatus of the present invention which comprises a scanning means for decomposing input character strings written in accordance with the specification of ISO/8824/ASN.1 (International Organization for Standardization 8824 Abstract Syntax Notation One). Keywords representative of types and attributes are detected from the decomposed character strings and type nodes are created from the detected type representative keywords and attribute nodes are created from the attribute representative keywords. Internode linking means is provided for establishing links between the type nodes and the attribute nodes according to hierarchical relationships between the type nodes and the attribute nodes and forming a tree structure by the established links. The tree structure is traced and the input character strings are translated according to the traced tree structure into a declaration sentence which can be processed by a computer program.

The present invention further provides a method for structuring data, which method comprises the steps of decomposing input character strings written in accordance with the specification of ISO/8824/ASN.1, detecting keywords representative of types and attributes from the decomposed character strings, deriving type nodes from the detected keywords representative of the types, deriving attribute nodes from the detected keywords representative of the attributes, establishing links between the type nodes and the attribute nodes according to hierarchical relationships between the type nodes and the attribute nodes and forming a tree structure by the established links; and tracing the tree structure and translating the input character strings according to the tree structure into a declaration sentence which can be processed by a computer program.

BRIEF DESCRIPTION OF THE DRAWINGS

The present invention will be described in further detail with reference to the accompanying drawings, in which:

FIG. 8 is an illustration of a typical example of a C-language declaration sentence as an output of the data structuring apparatus.

DETAILED DESCRIPTION

Figure 1:
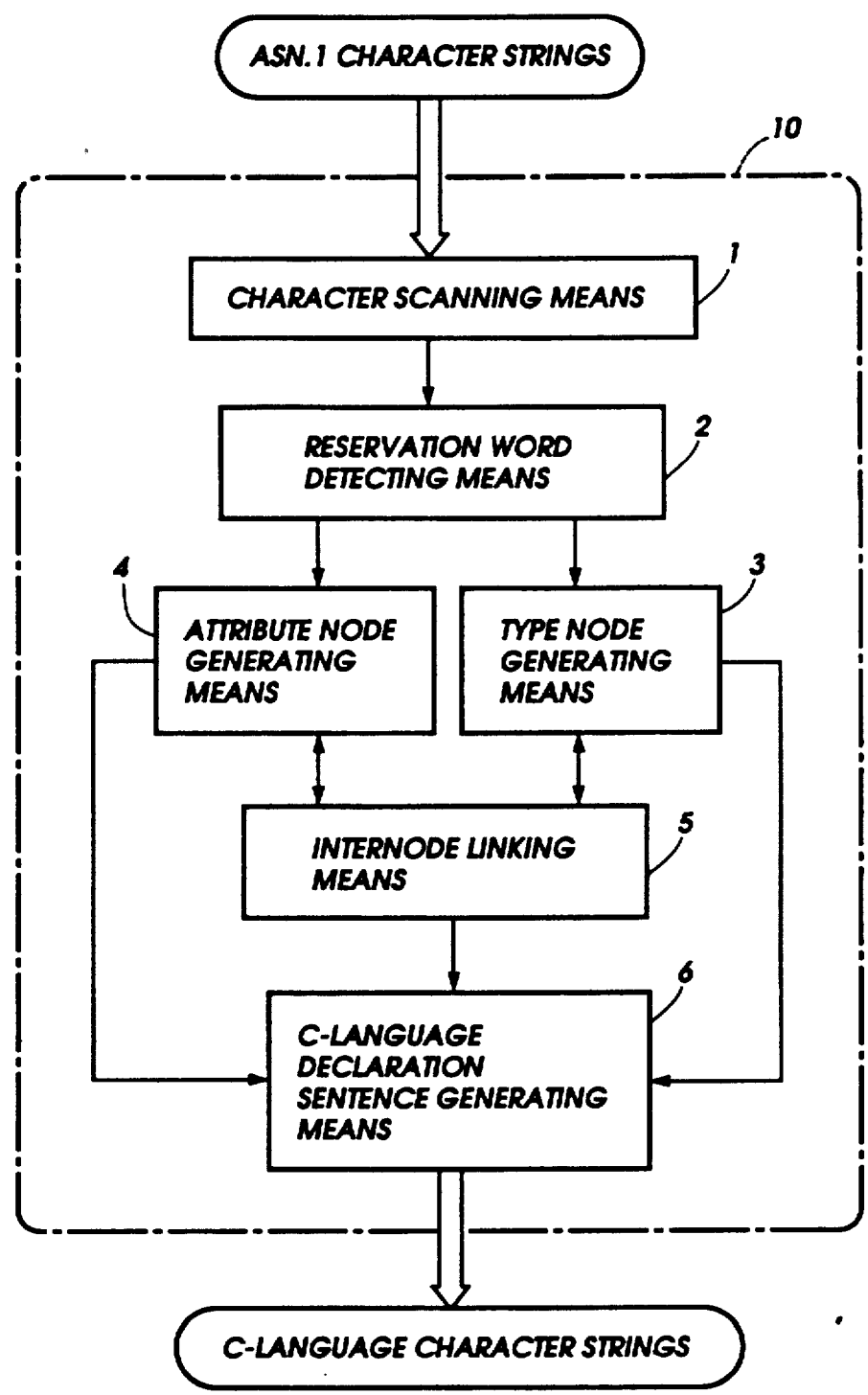
FIG. 1 is a block diagram of an ISO/8824/ASN.1 data structuring apparatus according to the present invention.

Referring now to FIG. 1, there is shown in ASN.1 data structuring apparatus according to an embodiment of the present invention. The ASN.1 data structuring apparatus, indicated at 10 in FIG. 1, comprises an ASN.1 scanning means 1, an ASN.1 keyword detecting means 2, a type node generating means 3, an attribute node generating means 4, an internode linking means 5 and a C-language declaration sentence generating means 6.

The ASN.1 scanning means 1 receives ASN.1 character strings which are described in accordance with the ISO/8824/ASN.1 specification and scans the character strings. The ASN.1 keyword detecting means 2 is associated with the scanning means 1 to detect keywords which can be classified as "type" and "attribute". The type node generating means 3 is associated with the keyword detecting means 2 to generate a node of fixed size (two items, for example) in accordance with a "type" keyword detected in the scanned character strings. The attribute node generating means 4 is also coupled to the keyword detecting means 2 to generate an attribute node of fixed size (four items, for example) in accordance with an "attribute" keyword detected in the scanned character strings. The internode linking means 5 establishes links between the type nodes and attribute nodes in tree form according to their hierarchical relationships. The C-language declaration sentence generating means 6 is associated with the node generating means 3 and 4 and internode linking means 5 to provide translation of the ASN.1 character string into character strings in the C-programming language by tracing the links established between the type and attribute nodes.

Figure 2:
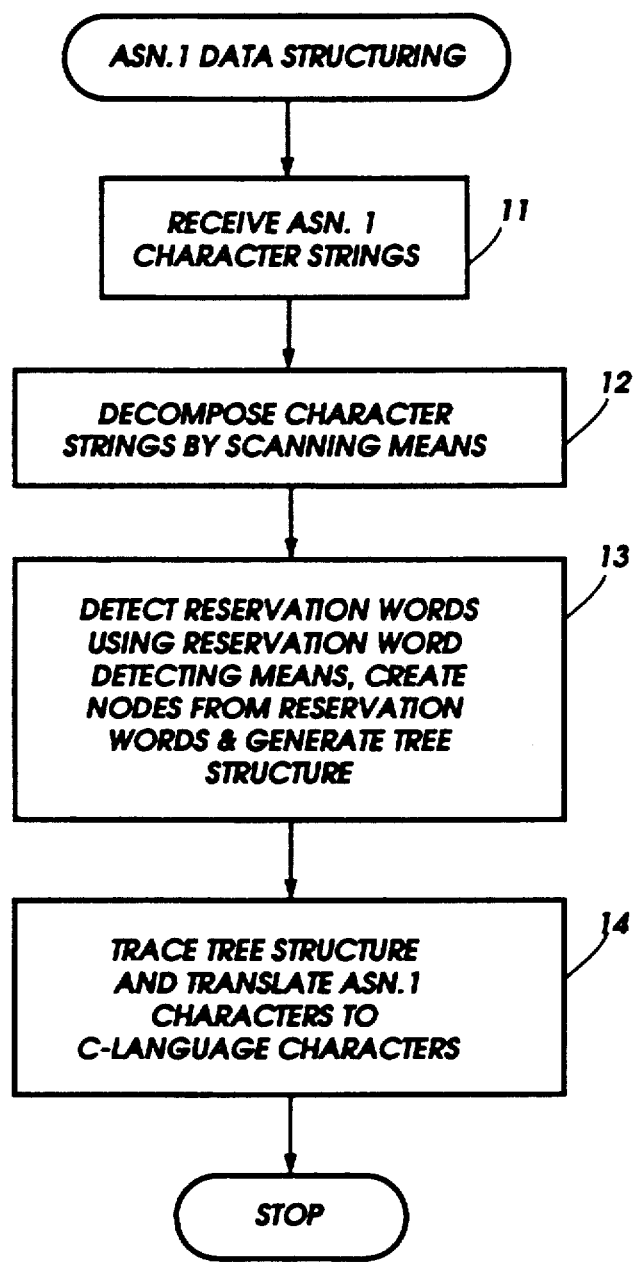
FIG. 2 is a flow diagram of the data structuring apparatus of FIG. 1.
Figures 5, 6:
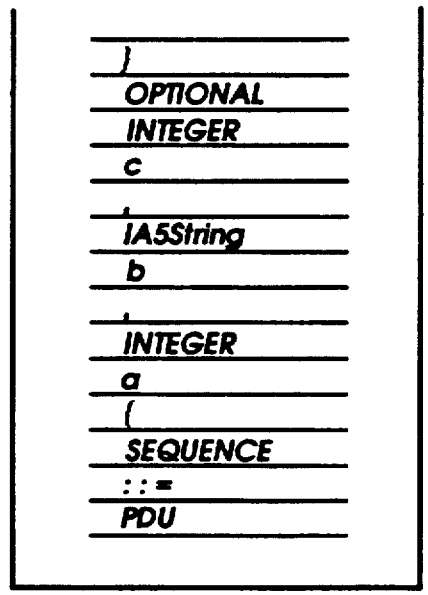
FIG. 5 is an illustration of a typical example of character strings written in accordance with the ISO/8824/ASN.1 which are supplied to the data structuring apparatus of FIG. 1.
FIG. 6 is an illustration of decomposed character strings after the input character strings are processed by the scanning means of FIG. 1.

As shown in FIG. 2, the ASN.1 data structuring apparatus 10 is programmed to begin signal processing with operation block 11 which directs the scanning means 1 to receive ASN.1 character strings. Operations block 11 is followed by operations block 12 which directs the scanning means 2 to scan the loaded data to decompose it into individual character strings which are separated by blanks. Therefore, if protocol data units (PDU) as shown in FIG. 5 are applied to the data structuring apparatus 10, they are decomposed into a form as shown in FIG. 6. Exit then is to subroutine 13 which directs the ASN.1 keyword detecting means 2 to detect "type" keywords such as "INTEGER", "IA5-String" and "SEQUENCE" in the decomposed character strings, directs the node generating means 3 and 4 to generate nodes in cooperation with the internode linking means 5 in a manner described hereinbelow.

Figure 3:
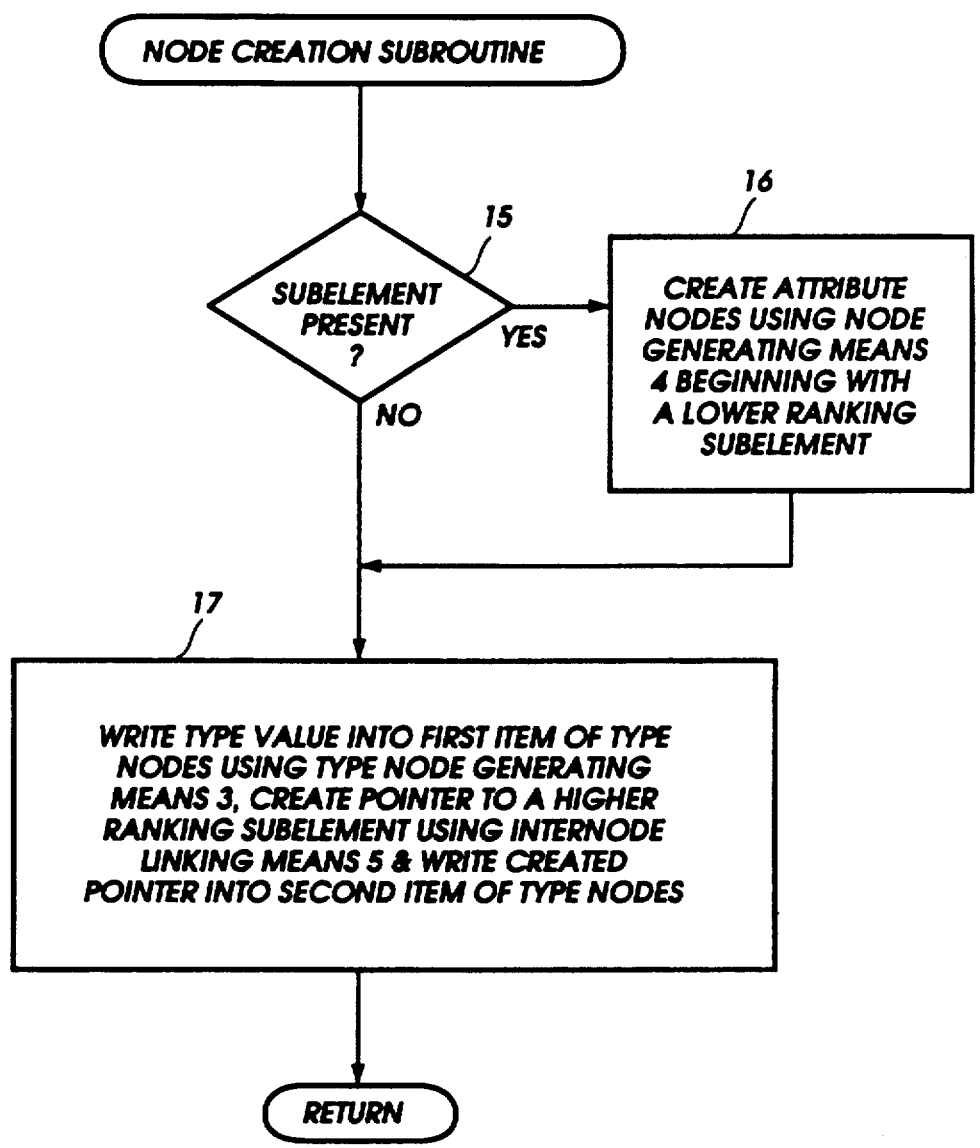
FIG. 3 is a flow diagram of the attribute node generating means of FIG. 1.
Figure 4:
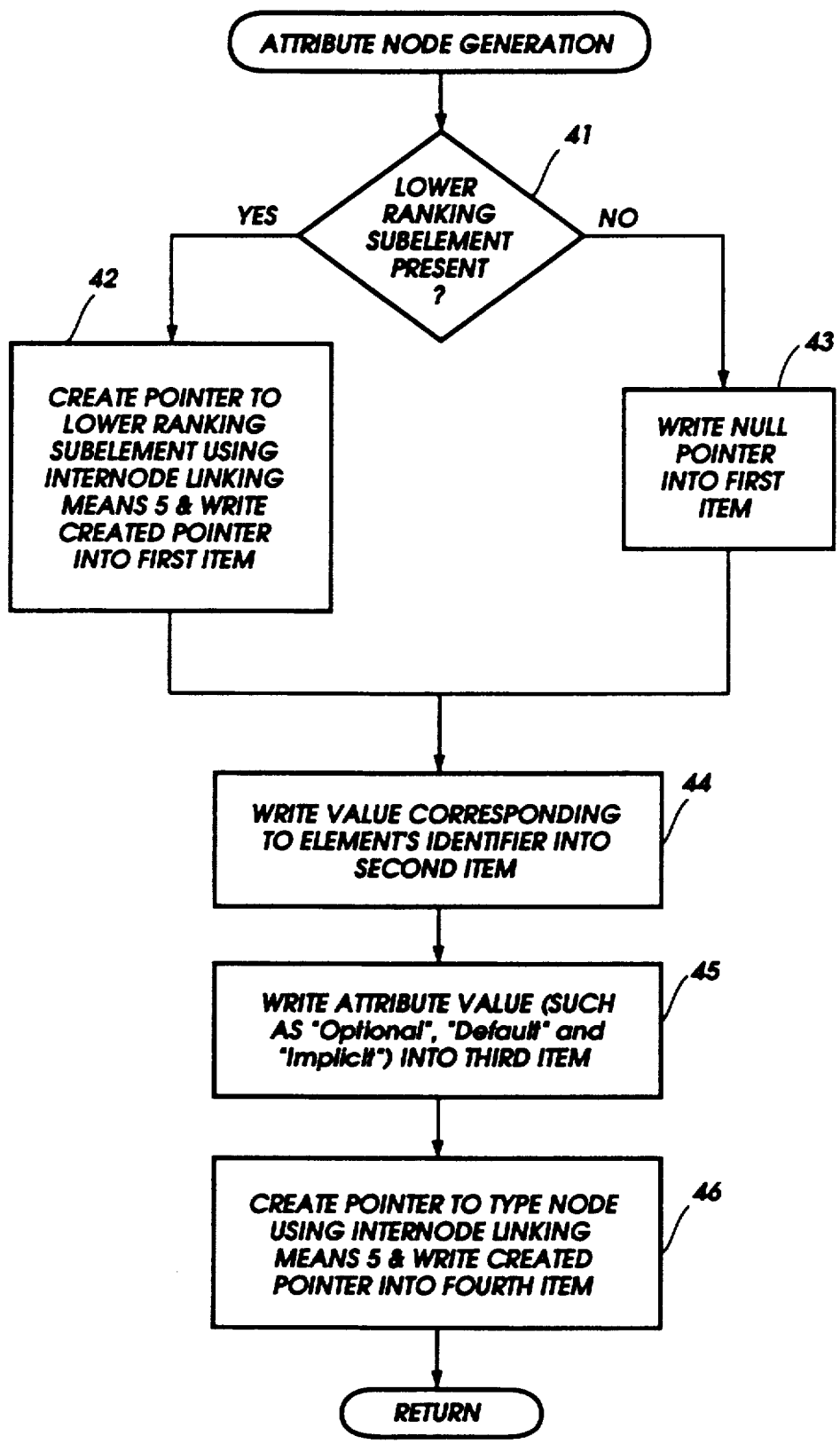
FIG. 4 is a flow diagram of the attribute node generating means of FIG. 2.
Figure 7:
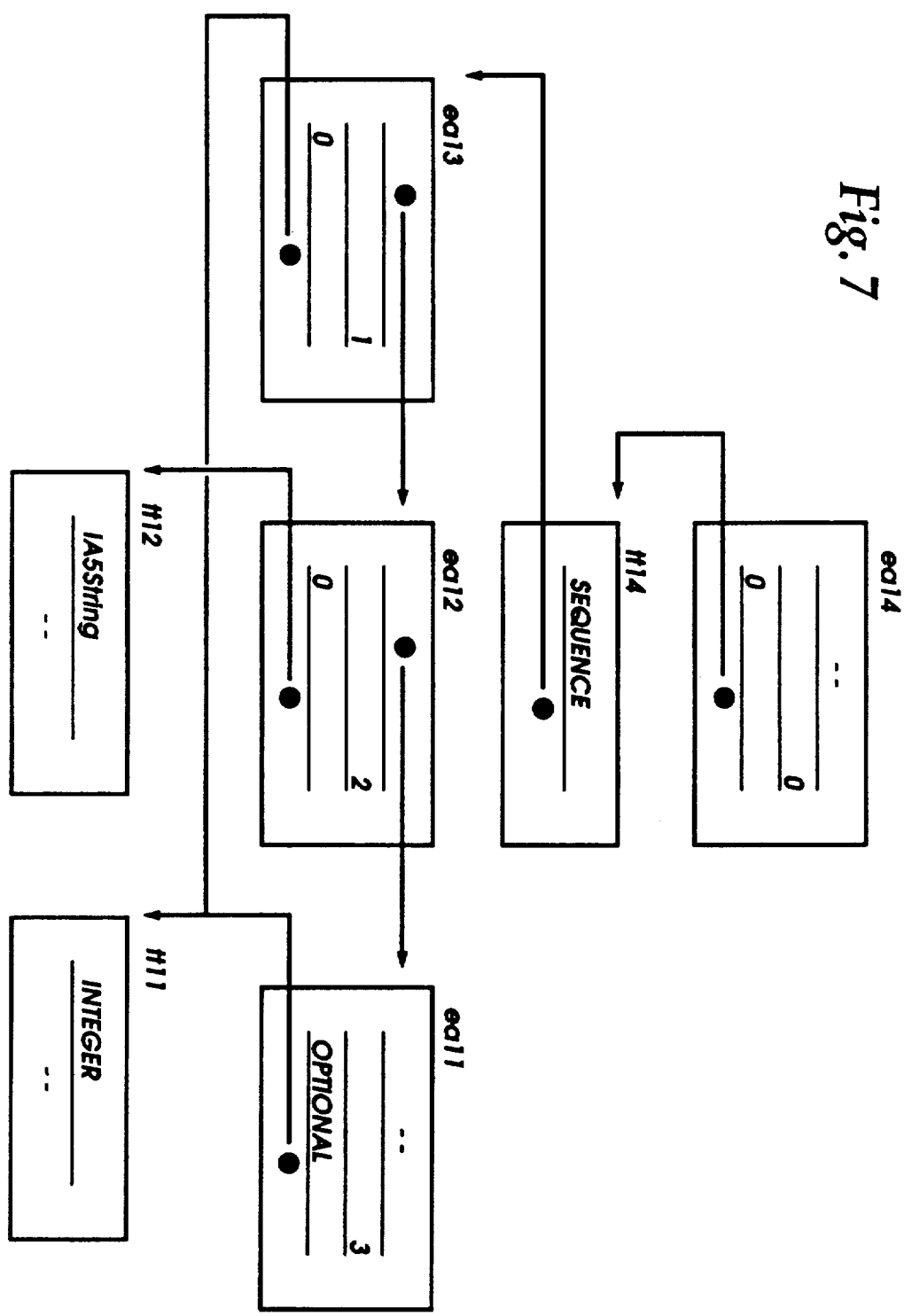
FIG. 7 is an illustration of a tree structure derived from the input character strings.

In FIG. 3, the node generating subroutine 13 of FIG. 2 begins with a decision block 15 which determines if each of the detected "type" keywords (elements) has a subelement. If the answer is affirmative, exit is to subroutine 16 which directs the attribute node generating means 4 to successively generate "attribute" nodes beginning with a subelement having a lowermost rank. Thus, in respect of "INTEGER", attribute nodes ea11 and ea13 are successively created and in respect of "IA5String" and "SEQUENCE" attribute nodes ea12 and ea14 are created, respectively (see FIG. 7). As shown in detail in FIG. 4, the subroutine 14 begins with a decision block 41 which determines if there if a lower ranking subelement in the elements detected by operations block 13. If there is one, exit is to operations block 42 which causes the internode linking means 5 to establish links between such subelements and directs the writing of pointers linking the above-mentioned "attribute" nodes into the first item of such attribute nodes having a lower ranking subelement. If there is no lower ranking subelement in the detected subelements, exit is to operations block 43 which directs the writing of a null pointer (- -) into the first item of an attribute node having no lower ranking subelement. As shown in FIG. 7, if attribute nodes ea11, ea12, ea13 and ea14 are ranked in an increasing order named, a pointer to attribute node ea11 is written into the first item of node ea12, a pointer to node ea12 is written into the first item of node ea13, and a null pointer (- -) is written into the first item of attribute nodes ea11 and ea14.

The attribute node generating means 4 proceeds to operations block 44 which directs the writing of a value corresponding to the identifier of a subelement into the second item of each attribute node. For example, identifiers "c", "b" and "a" are converted to numerical data "3", "2" and "1", respectively, and written into the second item of the attribute nodes ea11, ea12 and ea13, respectively, and "0" is written into the second item of node ea14 indicating that there is no identifier (see FIG. 7).

The attribute node generating means 4 advances to operations block 45 which directs the writing of an "attribute " value representative of the attribute of each subelement (such as "optional" attribute, "default" attribute, and "implicit" attribute) into the third item of each attribute node. As shown in FIG. 7, for example, the "OPTIONAL" attribute of "INTEGER" is written into the third item of attribute node ea11 and "0" is written into the third item of each of the attribute nodes ea12, ea13 and ea14 to indicate that there is no attribute for such nodes.

The attribute node generating means 4 further proceeds to operations block 46 which causes the internode linking means 5 to detect a pointer linking each attribute node to a "type" node and directs the writing of such a pointer into the fourth item of each node. As shown in FIG. 7, for example, a pointer to a type node tt11 is written into the fourth item of attribute node ea11, a pointer to a type node tt12 is written into the fourth item of attribute node ea12, a pointer to a type node tt11 is written into the fourth item of attribute node ea13 and a pointer to type node tt14 is written into the fourth item of attribute node ea14.

If the answer is negative in decision block 15 of subroutine 16 has been executed, control proceeds to subroutine 17 which directs the type node generating means 3 to write a value indicative of the type of each node into the first item of that node and directs the internode linking means 5 to detect a pointer linking each type node to a higher ranking attribute node if there is one and writes the pointer into the second item of type nodes. If there is no subelement, a null pointer is written into the second item of type nodes. As shown in FIG. 7, for example, "INTEGER", "IA5String", and "SEQUENCE" are written into the first item of the type nodes tt11, tt12 and tt14, respectively, and a null pointer is written into the second item of type nodes tt11 and tt12 and a pointer to attribute node ea13 is written into the second item of type node tt14.

In this way, attribute node and type nodes are linked in tree form. In operations block 14, the C-language declaration sentence generating means 6 traces the links between the various nodes and generates character strings written in the C-programming language as shown in FIG. 8 which are available as an output of the data structuring apparatus 10 to be processed in a C-language program.

As a result, protocols structured in accordance with the present invention can be directly processed by computers, eliminating the need for developing programs which would involve intensive development effort and the need for excessive overhead for syntax recognition.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A data structuring apparatus comprising:
   means for decomposing input character strings written in accordance with the specification of ISO/8824/ASN.1 (International Organization for Standardization 8824 Abstract Syntax Notation One);
   means for detecting keywords representative of types and attributes from said decomposed character strings;
   type node generating means for deriving type nodes from said detected keywords representative of said types;
   attribute node generating means for deriving attribute nodes from said detected keywords representative of said attributes;
   internode linking means for establishing links between said type nodes and said attribute nodes according to hierarchical relationships between said type nodes and said attribute nodes and forming a tree structure by the established links; and means for tracing said tree structure and translating said input character strings according to the links of said tree structure into a declaration sentence which can be processed by a computer program.

2. A method for structuring data, comprising the steps of:

(a) decomposing input character strings written in accordance with the specification of ISO/882-4/ASN.1 (International Organization for Standardization 8824 Abstract Syntax Notation One);

(b) detecting keywords representative of types and attributes from said decomposed character strings;

(c) deriving type nodes from said detected keywords representative of said types and deriving attribute nodes from said detected keywords representative of said attributes;

(d) establishing links between said type nodes and said attribute nodes according to hierarchical relationships between said type nodes and said attribute nodes and forming a tree structure by the established links; and (e) tracing said tree structure and translating said input character strings according to the links of said tree structure into a declaration sentence which can be processed by a computer program.

* * * * *